United States Patent [19]

Sunohara et al.

[11] Patent Number: 5,259,292
[45] Date of Patent: Nov. 9, 1993

[54] VACUUM BOOSTER

[75] Inventors: Hidemitsu Sunohara; Toshiyuki Suwa, both of Ueda, Japan

[73] Assignee: Nissin Kogyo Co., Ltd., Ueda, Japan

[21] Appl. No.: 886,495

[22] Filed: May 22, 1992

[30] Foreign Application Priority Data

Sep. 2, 1991 [JP] Japan .......................... 3-069962[U]

[51] Int. Cl.$^5$ ............................ F15B 9/10; F01B 19/00
[52] U.S. Cl. ............................ 91/369.1; 91/376 R; 92/98 R; 92/99
[58] Field of Search .......... 91/369.1, 369.2, 376 R; 92/48, 96, 98 R, 99, 100, 169.1

[56] References Cited

U.S. PATENT DOCUMENTS

| | | | |
|---|---|---|---|
| 2,448,981 | 9/1948 | Ingres | 91/376 R |
| 3,132,567 | 5/1964 | Ingres | 91/369.2 |
| 4,072,365 | 7/1978 | Pauwels | 303/115 |
| 4,296,680 | 10/1981 | Ohta et al. | 92/98 D |
| 4,522,108 | 6/1985 | Takeuchi et al. | 91/376 R |
| 4,821,623 | 4/1989 | Shinohara | 91/376 R |
| 4,936,635 | 6/1990 | Sakaguchi | 303/4 |
| 5,025,709 | 6/1991 | Miyazaki | 92/169.1 X |

FOREIGN PATENT DOCUMENTS

| | | | |
|---|---|---|---|
| 2085987 | 6/1981 | United Kingdom | 91/369.2 |
| 2145788 | 4/1985 | United Kingdom | 91/376 R |

Primary Examiner—Edward K. Look
Assistant Examiner—Hoang Nguyen
Attorney, Agent, or Firm—Armstrong, Westerman, Hattori, McLeland & Naughton

[57] ABSTRACT

A vacuum booster has a booster shell formed of a front shell half and a rear shell half interconnected at their open ends opposed to each other, and a diaphragm which divides the shell interior into a vacuum chamber on the front shell half side and a working chamber on the rear shell half side. An outer peripheral bead portion of the diaphragm is clamped between the open ends of both the shell halves with an outer surface of the outer peripheral bead portion being contacted under pressure with an inner surface of the open end of the front shell half. The outer peripheral bead portion is provided at an outer periphery thereof with a first tapered surface tapered toward the front shell half and a second tapered surface tapered toward the rear shell half such that the first and second tapered surfaces are formed into an angled shape in their cross section. Thus, the frictional resistance upon the insertion of the diaphragm during assembling of the vacuum booster can be made relatively small, thereby improving an assembling and insuring a sufficient sealing by the outer peripheral bead portion.

14 Claims, 7 Drawing Sheets

VACUUM BOOSTER

BACKGROUND OF THE INVENTION

1. Field of the Invention

This invention relates to a vacuum booster comprising a booster shell comprised of a front shell half and a rear shell half interconnected with their open ends opposed to each other, and a diaphragm which divides an interior of the booster shell into a vacuum chamber on a side of the front shell half and a working chamber on a side of the rear shell half and is provided with an outer peripheral bead portion clamped between the open ends of the shell halves with an outer surface of the outer peripheral bead portion being contacted under pressure with an inner surface of the open end of the front shell half.

2. Description of the Prior Art

Such a vacuum booster is already known, for example, from Japanese Utility Model Application Laid-open No. 108857/88.

In order to insure a sufficient airtightness of the vacuum chamber, it is desirable to establish a large surface pressure between the outer surface of the outer peripheral bead portion of the diaphragm and the inner surface of the open end of the front shell half. In the above-described prior art vacuum booster, however, the outer peripheral bead portion is formed into a mere cylindrical shape with its wall thickness being substantially constant. To increase the surface pressure, it is necessary to provide a relatively large wall thickness of the outer peripheral bead portion in its natural state, permitting the outer peripheral bead portion to be deflected in an increased amount in its applied state. However, the increase in wall thickness in such a manner results in a large frictional resistance when the outer peripheral bead portion of the diaphragm is inserted into the open end of the front shell half during assembling, leading to an inferior assembling.

SUMMARY OF THE INVENTION

Accordingly, it is an object of the present invention to provide a vacuum booster wherein the frictional resistance upon the insertion of the diaphragm during assembling of the vacuum booster is relatively small, thereby enabling an improvement in assembling, and a sealing by the outer peripheral bead portion can sufficiently be insured.

To achieve the above object, according to a first feature of the present invention, the outer peripheral bead portion is provided at an outer periphery thereof with a first tapered surface tapered toward the front shell half and a second tapered surface tapered toward the rear shell half such that the first and second tapered surfaces is formed into an angled shape in its cross section.

With the first feature, the frictional resistance upon the insertion of the outer peripheral bead portion into the front shell half during assembling can be reduced to a relatively small level, thereby improving an assembling process, and the surface pressure between the outer peripheral bead portion and the front shell half can be sufficiently increased to insure a sealing.

In addition to the first feature, according to a second feature of the present invention, the front shell half is provided with a cylindrical increased-diameter portion formed larger in diameter than that of a main front shell half portion formed into a bowl-like configuration with a step interposed therebetween, and the diaphragm comprises a main diaphragm portion formed into a bowl-like configuration opened toward said front shell half, a curved portion reversely curved from an open end of said main diaphragm portion toward said rear shell half, a cylindrical guide portion continuously formed with said curved portion so as fit into the open end of said main front shell half portion, and the outer peripheral bead portion continuously formed with said cylindrical guide portion to contact under pressure with an inner surface of said cylindrical increased-diameter portion, and the length from the connection between the first and second tapered surfaces to a front end of said cylindrical guide portion is set larger than the length of the cylindrical increased-diameter portion.

With the second feature, the alignment of the rear shell half and the diaphragm with the front shell half can be facilitated, and a further improved assembling can be provided.

The above and other objects, features and advantages of the invention will become apparent from a consideration of the following description of the preferred embodiments, taken in conjunction with the accompanying drawings.

BRIEF DESCRIPTION OF THE DRAWINGS

FIGS. 1 to 5 illustrate a first embodiment of the present invention, wherein

FIG. 1 is a longitudinal sectional view of a vacuum booster of the first embodiment;

FIG. 2 is an enlarged view of an encircled portion indicated by an arrow 2 in FIG. 1;

FIG. 3 is an enlarged back view taken along an arrow 3 in FIG. 1;

FIG. 4 is a back view similar to FIG. 3, but with the engagement between first and second shell halves being released; and FIG. 5 is a sectional view similar to FIG. 2, but in the course of assembling.

DESCRIPTION OF THE PREFERRED EMBODIMENTS

A first embodiment of the present invention will now be described with connection with FIGS. 1 to 5.

Figure 1:
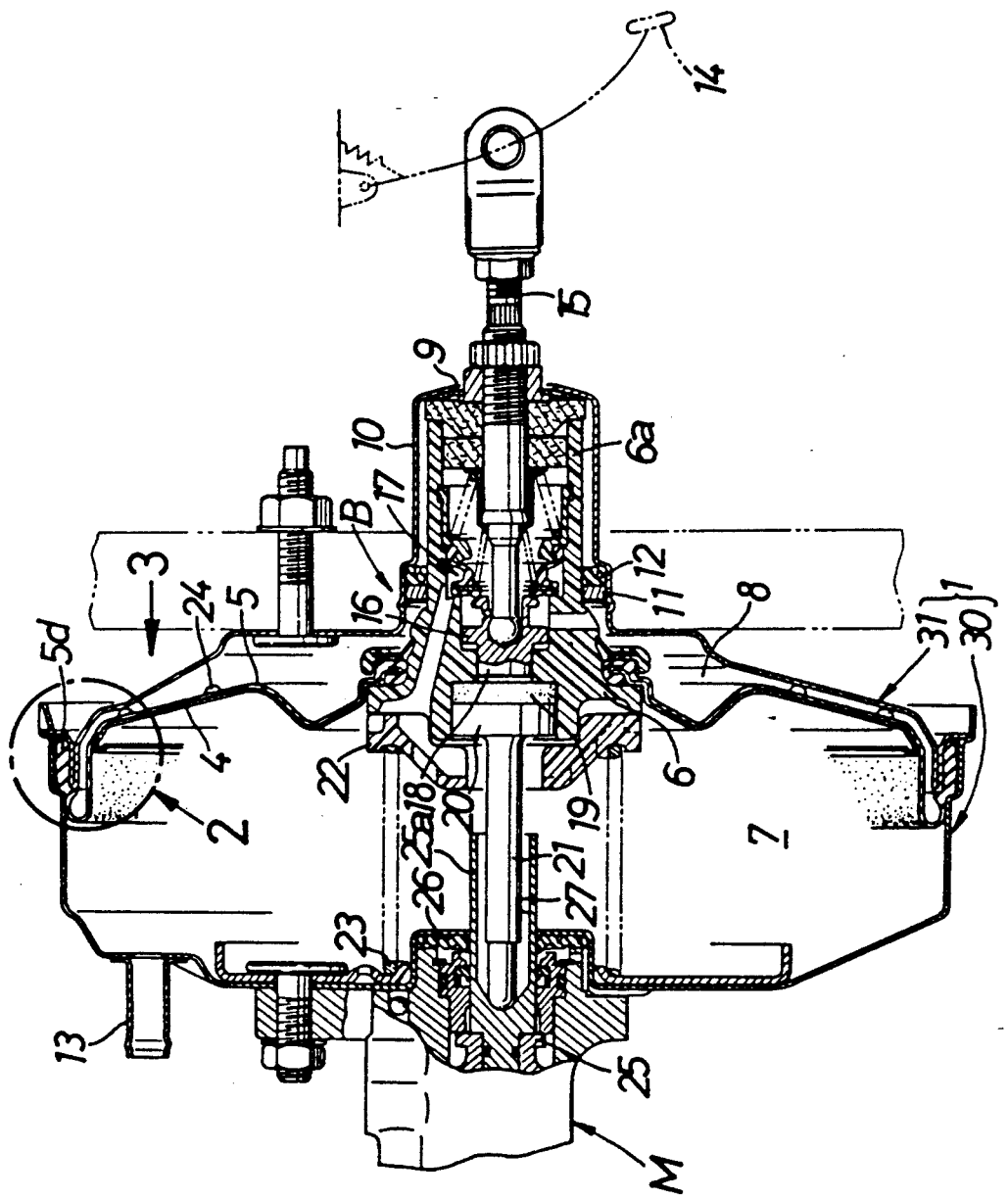

Referring first to FIG. 1, a master cylinder M is mounted on a front wall of a booster shell 1 in a vacuum booster B and operated by the booster B.

A booster piston 4 is contained within the booster shell 1 for a longitudinal reciprocation. A diaphragm 5 is superposed on a rear surface of the booster piston 4. An outer periphery of the diaphragm 5 is securely supported by the booster shell 1 and an inner periphery thereof is coupled to a piston boss 6 along with an inner periphery of the booster piston 4. Moreover, an interior of the booster shell 1 is divided by the booster piston 4 and the diaphragm 5 into a front vacuum chamber 7 which a front surface of the booster piston 4 faces, and a rear working chamber 8 which a rear surface of the diaphragm 5 faces.

A cylindrical valve case 6a is projected from a rear end of the piston boss 6 and is slidably carried on a rearwardly extended cylinder 10 with a bush 11 and a sealing member 12 interposed therebetween. The rearwardly extended cylinder 10 is projected from a central portion of a rear wall of the booster shell 1 to cover the valve case 6a and is provided at a rear end thereof with an atmospheric air inlet opening 9.

A vacuum pressure introducing pipe 13 is connected to the front wall of the booster shell 1, and the vacuum chamber 7 normally communicates with an intake manifold (not shown) of an internal combustion engine, which is a vacuum pressure source, through the vacuum pressure introducing pipe 13.

An input rod 15 is connected to a brake pedal 14, and a valve piston 16 is swingably connected to the input rod 15 and slidably received in the piston boss 6. A control valve 17 is interposed between the working chamber 8 and the vacuum chamber 7 as well as the atmospheric air introducing opening 9 and is operated in a switching manner in response to a relative movement of the valve piston 16 with respect to the piston boss 6 by advancing or retreating movement of the input rod 15 in accordance with the operation of the brake pedal 14.

The control valve 17 is conventionally well-known and adapted to cut off the communication between the vacuum chamber 7 and the working chamber 8 and also the communication of the chambers 7 and 8 with the atmospheric air introducing opening 9 in a condition in which the brake pedal 14 is not operated. When the valve piston 16 is advanced relative to the piston boss 6 by the operation of the brake pedal 14, the control valve 17 permits the working chamber 8 to be put into communication with the atmospheric air introducing opening 9. When the valve piston 16 is further advanced relative to the piston boss 6, the control valve 17 permits the vacuum chamber 7 to be put into communication with the working chamber 8.

A reaction piston 18, which is either integral with the valve piston 16 or abuttable against a front surface of the valve piston 16, is slidably received in the piston boss 6, and a resilient piston 19 made of rubber and an output piston 20 are also slidably received in the piston boss 6 in abutment against each other in front of the reaction piston 18. An output rod 21 is projectingly provided on a front surface of the output piston 20.

A retainer 22 made of synthetic resin is fitted and abutted to a front surface of the piston boss 6 to inhibit the falling-off of the output piston 20 from the piston boss 6. The booster piston 4 is normally biased in a retreating direction, i.e., toward the working chamber 8 by a return spring 23 which is mounted in a compressed manner between the retainer 22 and the front wall of the booster shell 1. A retreat limit for the booster piston 4 is defined by abutment of a projection 24 formed in a raised manner on the rear surface of the diaphragm 5 against an inner surface of the rear wall of the booster shell 1.

A piston rod 25a is coaxially and continuously connected to a working piston 25 of the master cylinder M and coaxially and movably projects the front wall of the booster shell 1 through with a sealing member 26 interposed therebetween. The piston rod 25a also, has a recess 27 coaxially provided therein and opened at its rear end. A closed front end of the recess 27 is formed into a curved hemispherical shape. The output rod 21 coupled to the output piston 20 is coaxially inserted into the recess 27 with a tip end of the output rod 21 against the closed front end of the recess 27.

The booster shell 1 is comprised of a front shell half 30 and a rear shell half 31 coupled to each other with their open ends opposed to each other. The outer periphery of the diaphragm 5 is clamped between the open ends of the shell halves 30 and 31. The coupling structure for the shell halves 30 and 31 and the clamping structure of the diaphragm 5 in the booster shell 1 will be described below.

Figure 2:
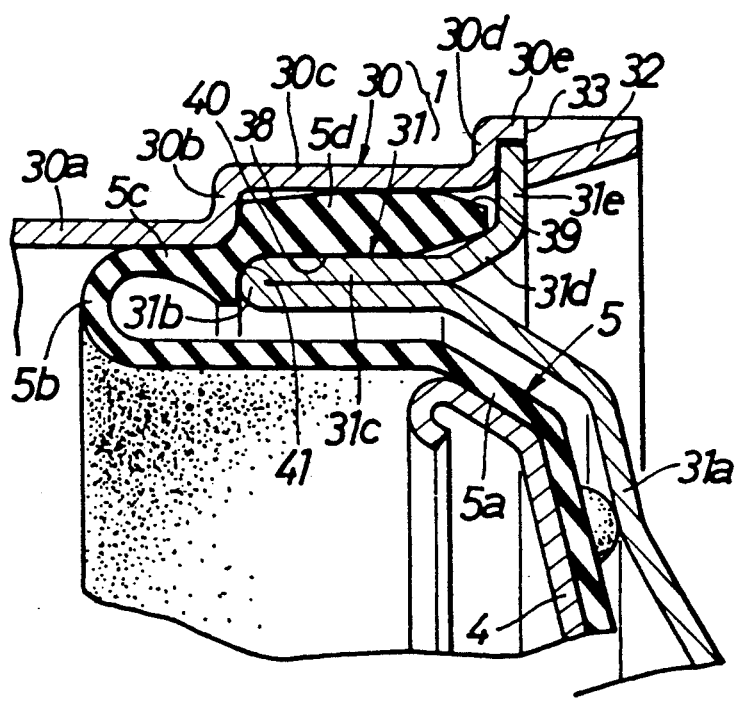

Referring to FIG. 2, the front shell half 30 comprises a main front shell half portion 30a formed into a bowl-like configuration opened toward the rear shell half 31, a first cylindrical increased-diameter portion 30c enlarged from an open end of the front main shell half portion 30a with a first step 30b interposed there between and facing toward the rear shell half 31, and a second cylindrical increased-diameter portion 30e further enlarged from the first cylindrical large diameter portion 30c with a second step 30d interposed there between and facing toward the rear shell half 31.

On the other hand, the rear shell half 31 comprises a main rear shell half portion 31a formed into a bowl-like configuration opened toward the front shell half 30, a cylindrical fitting portion 31c which extends rearwardly (rightwardly in FIG. 2) from a bent portion 31b at the open end of the main rear shell half portion 31a and which is superposed onto an outer face of the open end portion of the main rear shell half portion 31a, a tapered portion 31d continuously formed to a rear end of the cylindrical fitting portion 31c with its diameter increased rearwardly, and a flange portion 31e bent radially outwardly from the largest diameter end of the tapered portion 31d. The flange portion 31e is fitted into the second cylindrical increased-diameter portion 30e to abut against the second step 30d, and the cylindrical fitting portion 31c is disposed coaxially with the first cylindrical increased-diameter portion 30c of the front shell half 30.

Figure 3:
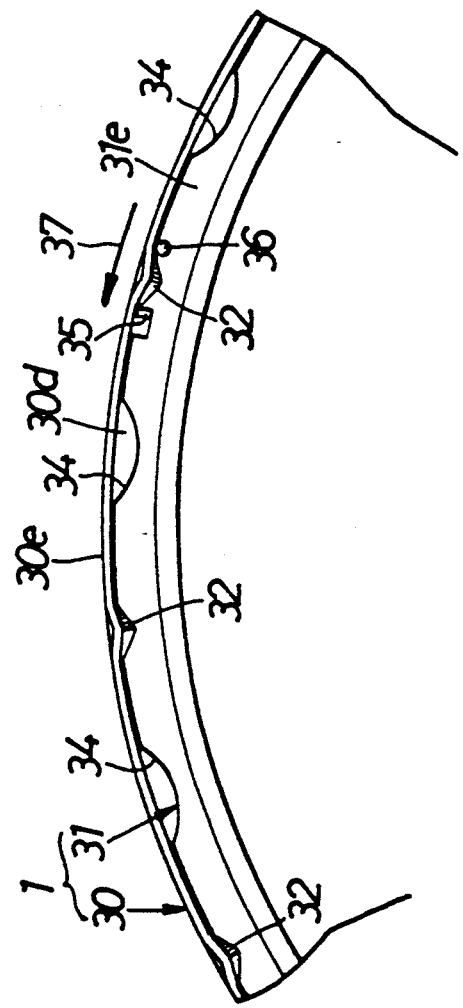

Referring also to FIG. 3, a plurality of engage projections 32 are provided on the second cylindrical increased-diameter portion 30e of the front shell half 30 at circumferential distances to engage the flange portion 31e of the rear shell half 31 from the rear. These engage projections 32 are formed by bending rear end portions of the second cylindrical increased-diameter portion 30e radially inwardly. The second cylindrical increased-diameter portion 30e is previously provided with a plurality of cuts 33 extending circumferentially just in front of the bent portions so as to separate the bent portions from the other portions, in order to enable the bending of each of the engaging projections 32 in a condition in which the flange portion 31e is in abutment against the second step 30d, when the front and rear shell halves 30 and 31 are to be coupled to each other during assembling of the vacuum booster B.

Figure 4:
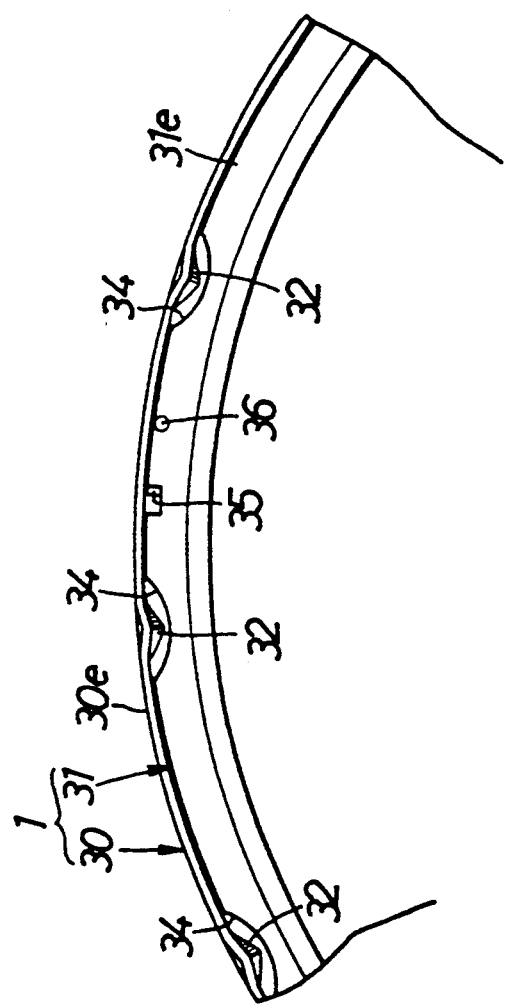

A plurality of notches 34 are provided at circumferential distances in an outer edge of the flange portion 31e of the rear shell half 31 for permitting the engage projections 32 to pass therethrough. The flange portion 31e is further provided with a first restraining projection 35 adapted to engage a particular engage projection 32 at a circumferential side of the projection 32, and a second restraining projection 36 adapted to engage the particular engaging projection 32 at the circumferential opposite side. The first restraining projection 35 is formed on a rear surface of the flange portion 31e to have two inclined surfaces so that the engage projection 32 can climb over the first restraining projection 35. If each engage projection 32 is brought into a position corresponding to the notch 34 as shown in FIG. 4, by turning the front shell half 30 in a direction of an arrow 37 from a state shown in FIG. 3, the coupling of the front shell half 30 and the rear shell half 31 is released.

Figure 5:
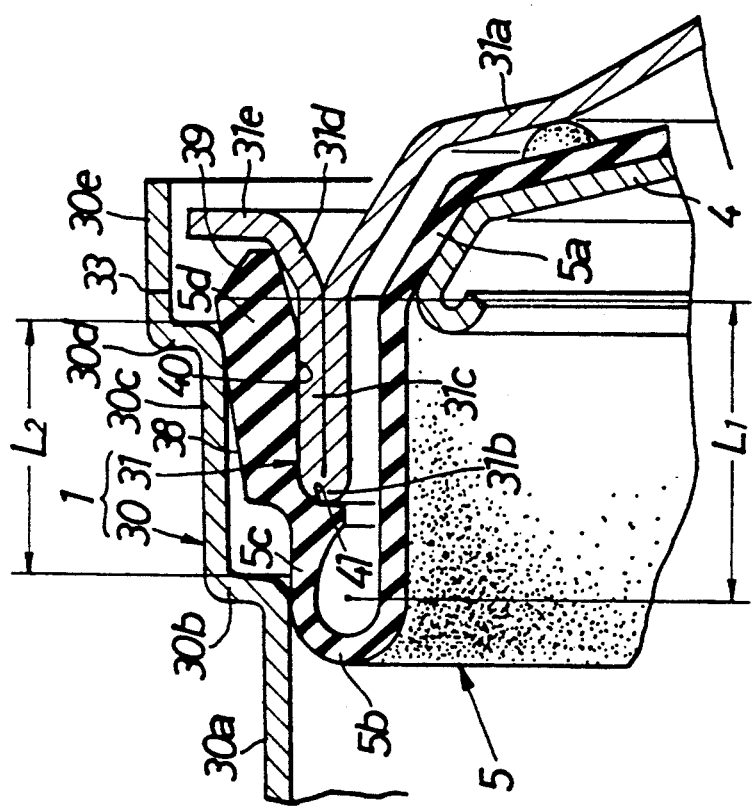

Referring again to FIG. 2, the diaphragm 5 includes a main diaphragm portion 5a formed into a bowl-like configuration opened toward the front shell half 30 and superposed on a back surface of the booster piston 5, a curved portion 5b reversely curved from the open end of the main diaphragm portion 5a toward the rear shell half 31, a cylindrical guide portion 5c continuously formed to the curved portion 5b, so that it can fit into of the open end of the front main shell half portion 30a, and an outer peripheral bead portion 5d continuously formed to the cylindrical guide portion 5c to come into contact with an inner surface of the first cylindrical increased-diameter portion 30c. Moreover, as shown in FIG. 5, the outer peripheral bead portion 5d has a first tapered surface 38 and a second tapered surface 39 on an outer surface thereof to have an angled sectional shape with their largest diameter ends being connected at an apex. The first tapered surface 38 is tapered toward the front shell half 30, and the second tapered surface 39 is tapered toward the rear shell half 31 in natural conditions thereof (with no external load). The outer peripheral bead portion 5d is also provided at an inner surface thereof with a fitting portion 40 into which the cylindrical fitting portion 31c of the rear shell half 31 is to be fitted. The inside diameter of the fitting portion 40 and the outside diameter of the cylindrical guide portion 5c are set substantially equal. Provided at a front end of the fitting portion 40, i.e., at a rear end of the cylindrical guide portion 5c is an engage portion 41 against which the curved portion 31b abuts from the rear in its axial direction.

As also shown in FIG. 5, in the diaphragm 5, the length $L_1$ from the connection between the first and second tapered surfaces 38 and 39 to a front end of the cylindrical guide portion 5c (i.e., the connection between the cylindrical guide portion 5c and the curved portion 5b) is set larger than the length of the first increased-diameter portion 30c of the front shell half 30, i.e., the length $L_2$ between the first and second steps 30b and 30d.

The operation of this embodiment will be described below. When assembling the vacuum booster B, the cylindrical fitting portion 31c of the rear shell half 31 is fitted into the outer peripheral bead portion 5d of the diaphragm 5, and the curved portion 31b abuts against the engage portion 41, as shown in FIG. 5. The outer peripheral bead portion 5d is fitted into the first increased-diameter portion 30c of the front shell half 30 by urging the rear shell half 31 until the flange portion 31e abuts against the second step 30d.

In this case, the alignment of the rear shell half 31 relative to the front shell half 30 and the forward urging of the rear shell half 31 are facilitated by the fact that the cylindrical guide portion 5c of the diaphragm 5 is fitted into the open end of the main front shell half portion 30a, before the outer peripheral bead portion 5d contacts on the inner surface of the first cylindrical increased-diameter portion 30c, because the length $L_1$ from the connection between the first and second tapered surfaces 38 and 39 to the front end of the cylindrical guide portion 5c is set larger than the length $L_2$ of the first increased-diameter portion 30c. In this operation, an urging force is applied in the axial direction to the cylindrical guide portion 5c through the curved portion 31b while permitting an inward deflection of the guide portion 5c and for this reason, little frictional resistance may act between the cylindrical guide portion 5c and the main front shell half portion 30a. In addition, since the first tapered surface 38 tapered toward the front shell half 30 is provided on the outer periphery of the outer peripheral bead portion 5d at the front side thereof, the frictional resistance in fitting the outer peripheral bead portion 5d into the first cylindrical increased-diameter portion 30c is relatively small, thereby facilitating the insertion of the outer peripheral bead portion 5d into the front shell half 30.

The front shell half 30 and the rear shell half 31 constituting the booster shell 1 are coupled to each other by bending the plurality of engage projections 32 in the condition in which the flange portion 31e is in abutment against the second step 30d, thereby bringing the engage projections 32 into engagement with the back surface of the flange portion 31e, and by turning the front shell half 30 to bring the first and second restraining projections 35 and 36 into engagement with opposite sides of several engage projections 32.

Upon the completion of such assembling of the vacuum booster B, the outer peripheral bead portion 5d of the diaphragm 5 is clamped between the open ends of the shell halves 30 and 31, and the outer surface of the outer peripheral bead portion 5d resiliently bears on the inner surface of the first cylindrical increased-diameter portion 30c of the front shell half 30 to seal the vacuum chamber 7 off from the outside. Moreover, the cross section of the outer surface of the outer peripheral bead portion 5d is formed into an angled shape by the first and second tapered surfaces 38 and 39, and a resilient force produced by deflection of the outer peripheral bead portion 5d clamped between the cylindrical fitting portion 31c and the first cylindrical increased-diameter portion 30c concentratedly acts on the apex of the angled shape, i.e., on the largest end connection between the tapered surfaces 38 and 39. This makes it possible to provide a sufficient large surface pressure between the outer surface of the outer peripheral bead portion 5d and the inner surface of the first cylindrical increased-diameter portion 30c to enhance the sealing of the vacuum chamber 7 to a sufficiently satisfactory extent.

Figure 6:
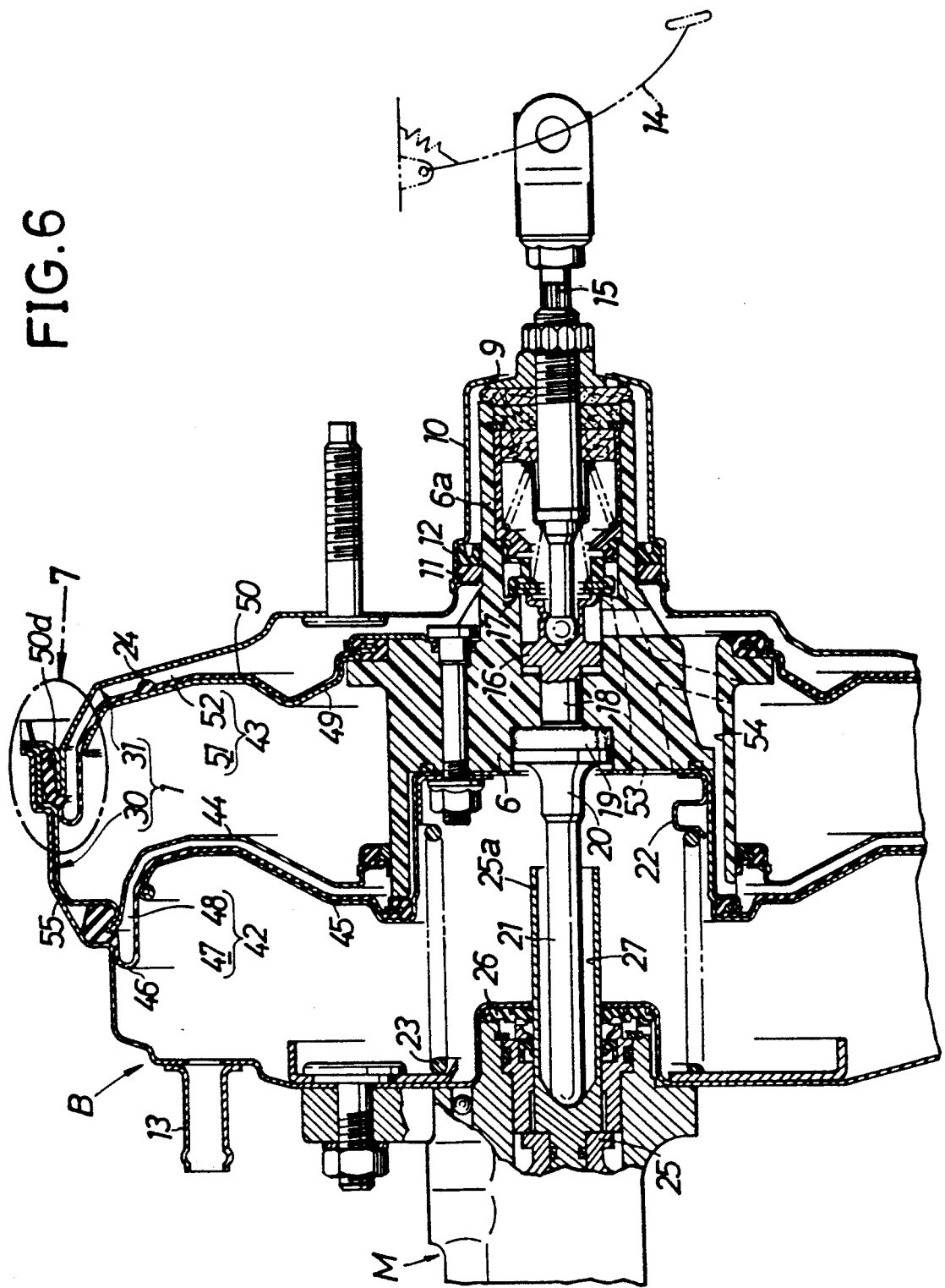
FIGS. 6 and 7 illustrate a second embodiment of the present invention, and are views similar to FIGS. 1 and 2 illustrating the first embodiment, respectively.
Figure 7:
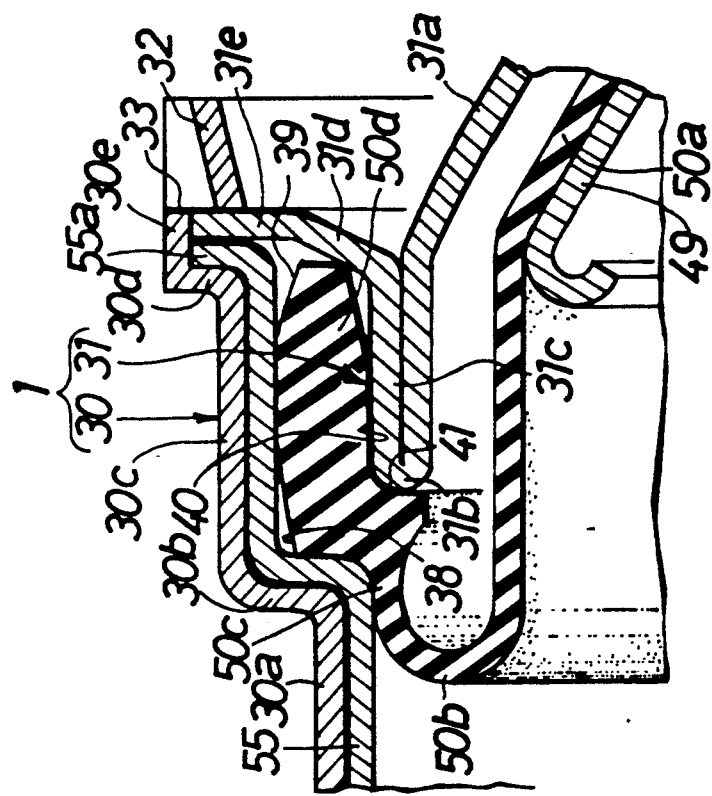

FIGS. 6 and 7 illustrate a second embodiment of the present invention applied to a structure for clamping an outer peripheral bead of a rear diaphragm in a tandem type vacuum booster.

The interior of the booster shell 1 of the tandem type vacuum booster B is partitioned into a front shell chamber 42 and a rear shell chamber 43 by a center plate 44. The front shell chamber 42 is divided into a fore-side vacuum chamber 47 and a back-side working chamber 48 by a front booster piston 45 secured to a front end of the piston boss 6 and a front diaphragm 46 superposed on a back surface of the front booster piston 45. The rear shell chamber 43 is divided into a fore-side vacuum chamber 51 and a back-side working chamber 52 by a rear booster piston 49 secured to a rear end of the piston boss 6 and a rear diaphragm 50 superposed on a back surface of the rear booster piston 49.

The vacuum chamber 47 of the front shell chamber 42 communicates with the vacuum pressure introducing pipe 13. The vacuum chambers 47 and 51 communicate with each other through a port 53 provided in the piston boss 6, and both the working chambers 48 and 52 communicate with each other by a port 54 provided in the piston boss 6. A control valve 17 is interposed between the ports 54 and 53 and an atmospheric air introducing opening 9. Both the working chambers 48 and 52 are adapted to selectively be put into communication with the vacuum chambers 47 and 51 and the atmospheric air introducing opening 9 in accordance with the operation of the brake pedal 14 by the action of the control valve 17.

The rear diaphragm 50 includes a curved portion 50b, a cylindrical guide portion 50c and an outer peripheral bead portion 50d, which portions have shapes similar to those of the curved portion 5b, the cylindrical guide portion 5c and the outer peripheral bead portion 5d of the diaphragm 5 in the previously-described embodiment. That is, a first tapered surface 38 and a second tapered surface 39 similar to those in the previous embodiment are formed on an outer surface of the outer peripheral bead portion 50d of the rear diaphragm 50.

The center plate 44 is integrally formed with a cylindrical liner 55 which is fitted into a rear half of the main front shell half portion 30a and an inner peripheral surface of the first increased-diameter portion 30c, and the outer peripheral bead portion 50c of the rear diaphragm 50 is fitted between the liner 55 and the cylindrical fitting portion 31c of the rear shell half 31. In this case, the structure of an opening in the rear shell half 31 for carrying the inner peripheral surface of the outer peripheral bead portion 50d is similar to that in the previous embodiment.

The liner 55 is provided at a rear end thereof with a flange 55a which is superposed on a back surface of the second step 30d extending from the first increased-diameter portion 30c to the second increased-diameter portion 30e of the front shell half 30. The flange 55a is clamped between the front and rear shell halves 30 and 31.

In FIGS. 6 and 7, parts or components corresponding to those in the previous embodiment are designated by like reference characters, and the overlapping description thereof is omitted.

In this embodiment, when assembling the vacuum booster B, the cylindrical liner 55 is fitted into the front shell half 30 and then, the rear shell half 31 with the rear diaphragm 50 fitted thereover is fitted and coupled to the front shell half 30. The outer peripheral bead portion 50d of the rear diaphragm 50 is easily inserted into the front shell half 30 even through the liner 55, as in the previous embodiment. Even upon completion of the assembling, the outer peripheral bead portion 50d enables a good sealing to be insured, as in the previous embodiment.

What is claimed is:

1. A vacuum booster comprising:
   a booster shell having a front shell half and a rear shell half interconnected with their open ends opposed to each other;
   a diaphragm which divides an interior of the booster shell into a vacuum chamber on a side of the front shell half and a working chamber on a side of the rear shell half, said diaphragm being provided with an outer peripheral bead portion clamped between the open ends of both the shell halves with an outer surface of the outer peripheral bead portion being contacted under pressure with an inner surface of the open end of the front shell half;
   said outer peripheral bead portion is provided at an outer periphery thereof with a first tapered surface tapered toward the front shell half and a second tapered surface tapered toward the rear shell half, said first and second tapered surfaces being connected together to define a ridge portion; and
   said first tapered surface is generally flat and extends across a majority of said outer periphery of said bead portion, said second tapered surface is substantially shorter than said first tapered surface, and said ridge portion is contacted with the inner surface of the outer peripheral bead portion proximate the rear half shell side.

2. A vacuum booster according to claim 1, wherein said front shell half is provided with a cylindrical increased-diameter portion formed larger in diameter than that of a main front shell half portion formed into a bowl-like configuration with a step interposed therebetween, and said diaphragm comprises a main diaphragm portion formed into a bowl-like configuration opened toward said front shell half, a curved portion reversely curved from an open end of said main diaphragm portion toward said rear shell half, a cylindrical guide portion continuously formed with said curved portion so as to be fitted into of the open end of said main front shell half portion, and the outer peripheral bead portion continuously formed with said cylindrical guide portion to contact under pressure with an inner surface of said cylindrical increased-diameter portion, and the length from the connection between the first and second tapered surfaces to a front end of said cylindrical guide portion is set larger than the length of the cylindrical increased-diameter portion.

3. A vacuum booster according to claim 1, wherein said front shell half is provided with a cylindrical increased-diameter portion formed larger in diameter than that of a main front shell half portion formed into a bowl-like configuration with a step interposed therebetween; said outer peripheral bead portion of said diaphragm is formed annularly so as to be inserted into said cylindrical increased-diameter portion; and said diaphragm is further provided with a cylindrical guide portion continuously formed with said outer peripheral bead portion to guide the insertion of said outer peripheral bead portion into said cylindrical increased-diameter portion, said cylindrical guide portion being fitted into of an open end of said main front shell half portion.

4. A vacuum booster according to claim 3, wherein the length from the connection between said first and second tapered surfaces of said outer peripheral bead portion to the front end of said cylindrical guide portion is set larger than the length of said cylindrical increased-diameter portion.

5. A vacuum booster according to claim 4, wherein said diaphragm includes a main diaphragm portion formed into a bowl-like configuration opened toward said front shell half, a curved portion reversely curved from an open end of said main diaphragm portion toward said rear shell half, said cylindrical guide portion continuously formed with said curved portion, and said outer peripheral bead portion continuously formed with said cylindrical guide portion; said rear shell half includes a cylindrical fitting portion fitted to an inner surface of said outer peripheral bead portion, and said diaphragm is further provided with an engage portion for receiving a tip end of said cylindrical fitting portion to transmit an axial urging force applied to said rear shell half to said diaphragm.

6. A vacuum booster according to claim 5, wherein said cylindrical guide portion is formed smaller in diameter than that of said outer peripheral bead portion, and said engage portion is provided at a rear end of said cylindrical guide portion.

7. A vacuum booster according to claim 6, wherein said cylindrical increased-diameter portion comprises a first cylindrical increased-diameter portion formed larger in diameter than that of said main front shell half portion with said step interposed therebetween, and a second cylindrical increased-diameter portion formed larger in diameter than that of said first cylindrical increased-diameter portion with another step interposed therebetween, and said rear shell half includes a flange portion flared outwardly from said cylindrical guide portion, said second cylindrical increased-diameter portion including an engage projection which is cut and raised to retain said flange portion in an abutting relation against said step between said first and second cylindrical increased-diameter portions during coupling of said front and rear shell halves.

8. A vacuum booster, comprising:
- a booster shell comprised of a front shell half and a rear shell half interconnected with their open ends opposed to each other,
- a center plate for partitioning an interior of said booster shell into a front shell chamber and a rear shell chamber, said center plate being continuously formed with a cylindrical liner fitted to an inner surface of the open end of said front shell half;
- a rear diaphragm which divides an interior of the rear shell chamber into a back-side vacuum chamber and a back-side working chamber communicating respectively with a fore-side vacuum chamber and a fore-side working chamber into which an interior of said front shell chamber is divided, said rear diaphragm including an outer peripheral bead portion clamped between the open ends of both the shell halves with an outer surface of the outer peripheral bead portion being contacted under pressure with an inner surface of the cylindrical liner proximate the open end of the front shell half;
- said outer peripheral bead portion is provided at an outer periphery thereof with a first tapered surface tapered toward the front shell half and a second tapered surface tapered toward the rear shell half, said first and second tapered surfaces being connected together to define a ridge portion; and
- said first tapered surface is generally flat and extends across a majority of said outer periphery of said bead portion, said second tapered surface is substantially shorter than said first tapered surface, and said ridge portion is contacted with the inner surface of the outer peripheral bead portion proximate the rear half shell side.

9. The vacuum booster of claim 1, wherein the rear half shell includes a bent portion which extends forwardly on an opposite side of the bead portion than a first cylindrical increased diameter portion of the front half shell and concentrically therewith.

10. The vacuum booster of claim 9, wherein said bent portion contacts an engaging portion of the diaphragm at a location below the bead portion and proximate the front of the bead portion.

11. The vacuum booster of claim 9, wherein said bent portion contacts said engaging portion at a location aligned with an upper wall of a cylindrical guide portion of the diaphragm, said cylindrical guide portion being situated forward of said bead portion.

12. The vacuum booster of claim 11, wherein a generally cylindrical inside surface of said bead portion is generally at the same diameter as the upper surface of the cylindrical guide portion.

13. The vacuum booster of claim 11, wherein the rear half shell includes a main rear half shell portion formed into a bowl-type configuration opened toward the front shell half, a cylindrical fitting portion which extends rearwardly from a bent portion to a perimeter of the main rear half shell portion, a tapered portion continuously formed with a rear end of the cylindrical portion with its diameter increasing rearwardly, and a flange portion extending radially outwardly from an increased diameter of the tapered portion; said flange portion engaging projections located on said front half shell.

14. A vacuum booster comprising:
- a booster shell having a front shell half and a rear shell half interconnected with their open ends opposed to each other;
- a diaphragm which divides an interior of the booster shell into a vacuum chamber on a side of the front shell half and a working chamber on a side of the rear shell half, said diaphragm being provided with an outer peripheral bead portion clamped between the open ends of both the shell halves with an outer surface of the outer peripheral bead portion being contacted under pressure with an inner surface of the open end of the front shell half;
- said outer peripheral bead portion is provided at an outer periphery thereof with a first tapered surface tapered toward the front shell half and a second tapered surface tapered toward the rear shell half, said diaphragm being formed by said first and second tapered surfaces into an angled shape in its cross section; and
- said first tapered surface is generally flat and extends across a majority of said outer periphery of said bead portion, said second tapered surface is substantially shorter than said first tapered surface, and said first and second tapered surfaces meet at an apex proximate the rear half shell side of the outer peripheral bead portion.

* * * * *